United States Patent [19]
Westveer
[11] Patent Number: 4,479,349
[45] Date of Patent: Oct. 30, 1984

[54] HYDRAULIC CONTROL SYSTEM

[75] Inventor: Robert C. Westveer, Kalamazoo, Mich.

[73] Assignee: General Signal Corporation, Stamford, Conn.

[21] Appl. No.: 322,909

[22] Filed: Nov. 19, 1981

[51] Int. Cl.³ .......................... F16D 33/02; F16H 39/48

[52] U.S. Cl. .......................................... 60/420; 60/422; 60/445; 60/450

[58] Field of Search ................. 60/420, 422, 423, 424, 60/445, 450, 494

[56] References Cited

U.S. PATENT DOCUMENTS

| | | | |
|---|---|---|---|
| 2,238,061 | 4/1941 | Kendrick . | |
| 3,768,928 | 10/1973 | Miller et al. . | |
| 3,878,679 | 4/1975 | Sievenpiper | 60/422 |
| 3,908,375 | 9/1975 | Young . | |
| 4,074,528 | 2/1978 | Lourigan et al. | 60/445 |
| 4,197,705 | 4/1980 | Westveer . | |
| 4,199,942 | 4/1980 | Kasper . | |
| 4,335,577 | 6/1982 | Lobmeyer et al. | 60/422 |

*Primary Examiner*—Robert E. Garrett
*Assistant Examiner*—John M. Husar
*Attorney, Agent, or Firm*—Barnes & Thornburg

[57] ABSTRACT

A hydraulic control system for regulating the distribution of fluid from a variable displacement pump to a plurality of fluid actuated devices is disclosed. The control system includes at least first and second control valves, each of which valves regulates the flow of fluid to a fluid actuated device. Each of the first and second control valves includes, respectively, a first means for developing a first pressure signal and a second means for developing a second pressure signal. A selector means senses the first and second pressure signals and transmits a control pressure signal which is the smaller of the two pressure signals to a fluid actuated displacement control means which regulates the displacement of the pump in response to the magnitude of the control pressure signal.

17 Claims, 1 Drawing Figure

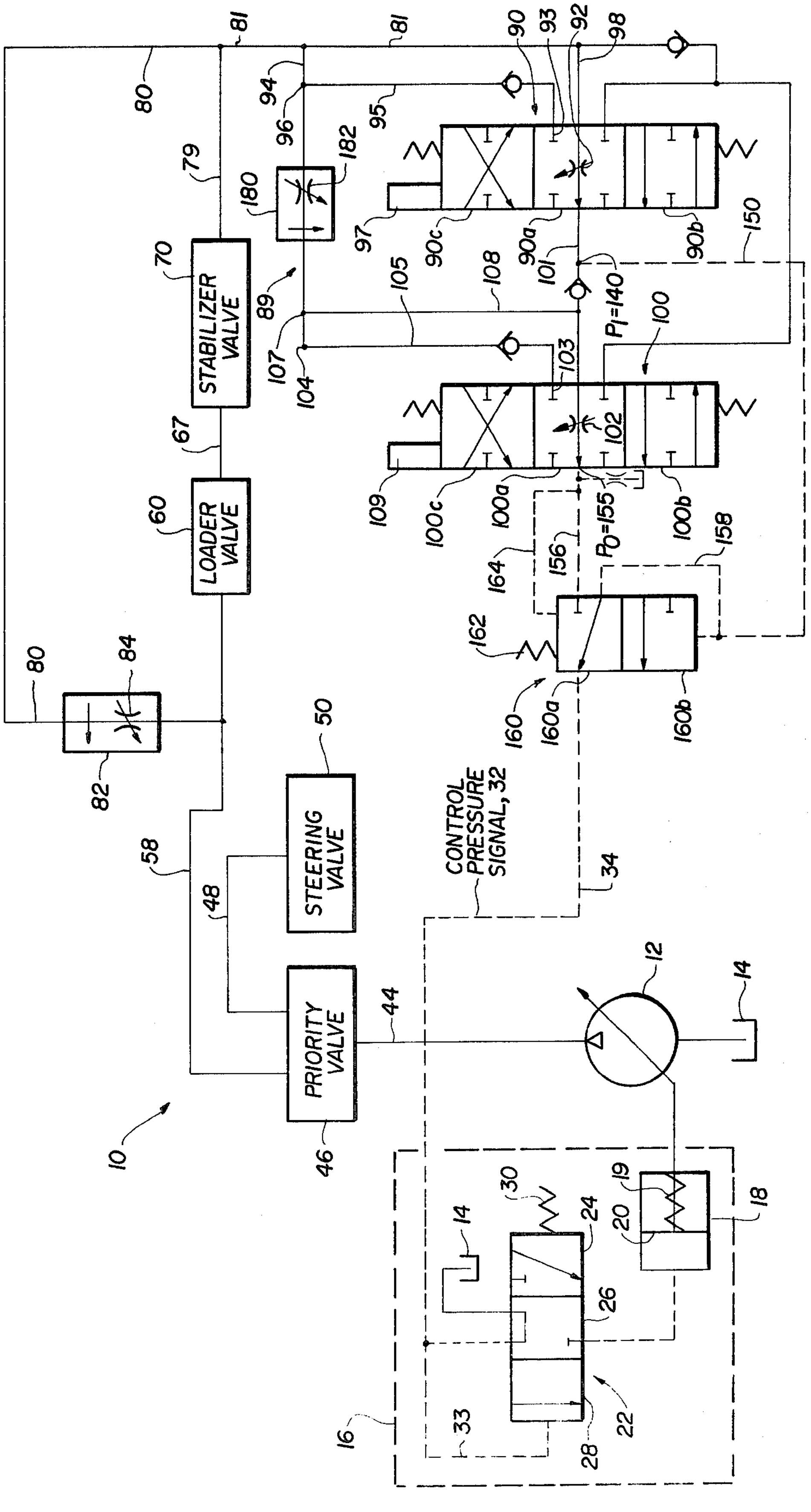
STABILIZER VALVE
LOADER VALVE
STEERING VALVE
PRIORITY VALVE
CONTROL PRESSURE SIGNAL, 32
$P_1$=140
$P_0$=155
10
12
14
16
18
19
20
22
24
26
28
30
33
34
44
46
48
50
58
60
67
70
79
80
81
82
84
89
90
90a
90b
90c
92
93
94
95
96
97
98
100
100a
100b
100c
101
102
103
104
105
107
108
109
150
156
158
160
160a
160b
162
164
180
182

HYDRAULIC CONTROL SYSTEM

BACKGROUND OF THE INVENTION

The invention disclosed herein pertains generally to hydraulic control systems for distributing fluid to a plurality of fluid actuated devices, and more particularly to a hydraulic control system which ensures that a particular fluid actuated device receives an adequate supply of fluid even when being used in conjunction with one or more of the other of the plurality of fluid actuated devices.

It is frequently necessary for a single hydraulic pump to provide sufficient hydraulic fluid to operate a plurality of fluid actuated devices. In the past it has been common to utilize fixed displacement pumps in combination with open center control valves to distribute the fluid to the various fluid actuated devices. Such systems have several drawbacks including the fact that they are energy inefficient because when the fluid actuated devices utilize only a portion of the output of the fixed displacement pump, the remainder of the pump power is wasted.

To overcome the deficiencies associated with hydraulic control systems which utilize fixed displacement pumps, variable displacement pumps have been used in combination with closed center control valves to achieve better system efficiency. In some applications the variable displacement pumps have been provided with pressure compensated controls, and in other applications variable displacement pumps in combination with a closed center control valve have been utilized in a load sensitive system. The former systems have usually been characterized by large pressure drops which results in a very inefficient use of energy. In the latter system, when a load is being lowered under the influence of gravity the load signal may reverse, resulting in diminished pump output rather than the desired increase in pump output.

The hydraulic control system disclosed in U.S. Pat. No. 3,788,077 to Johnson et al includes a variable displacement pump, an open center type of control valve, and a fluid actuated displacement control mechanism for the pump. A control pressure signal indicative of pump output pressure is developed in the control valve, and this control signal is communicated to the displacement control mechanism to regulate pump displacement. Systems of this type generally lack the responsiveness and sensitivity needed for the control of many types of fluid actuated devices.

The hydraulic control system disclosed in U.S. Pat. No. 4,197,705 to Westveer, which is hereby incorporated by reference, overcomes many of the aforementioned problems. This hydraulic control system includes a variable displacement pump which supplies fluid to a control valve which includes a plurality of control valves, each of which valves regulates the flow of fluid to a fluid actuated device. Each of the valves includes a relatively small, variable orifice in its center. A relatively small fluid flow from the variable displacement pump is supplied to the variable orifice of the first valve, and the output from each variable orifice of each valve is then directed to the input of the variable orifice of each succeeding valve. The resulting pressure signal sensed at a point downstream from the last of the variable orifices is referred to as a center core signal and constitutes a control signal. This control signal is communicated to a fluid actuated displacement control device which regulates the displacement of the variable displacement pump in response to the magnitude of the control signal. As the plunger of any one of the valves is moved from the neutral position toward an operating position, indicating the need for a greater supply of fluid to that valve, the size of the variable orifice of that valve is reduced, resulting in a decrease in the magnitude of the control signal. As the plungers of the other valves are moved from their neutral positions toward their operating positions, the magnitude of the control signal is further reduced. The displacement control device is such that a decrease in the magnitude of the control signal results in a corresponding increase in the displacement of the variable displacement pump.

While the hydraulic control system disclosed in U.S. Pat. No. 4,197,705 to Westveer is energy efficient and sufficiently sensitive and responsive for the control of many types of fluid actuated devices, neither this hydraulic control system nor any of the other above-mentioned hydraulic control systems is capable of ensuring that one particular fluid actuated device will be supplied with an adequate flow of fluid when being used in conjunction with one or more other fluid actuated devices.

SUMMARY OF THE INVENTION

The present invention is directed to a hydraulic control system for regulating a flow of fluid from a variable displacement pump to a plurality of fluid actuated devices, which control system ensures that a particular fluid actuated device receives an adequate supply of fluid even when being used in conjunction with one or more of the other fluid actuated devices. The present invention may, for example, be used as a hydraulic control system for a combination loader and backhoe vehicle to ensure that the swing valve of the backhoe valve receives an adequate supply of fluid from the variable displacement pump of the hydraulic control system even when being used in conjunction with one or more of the other backhoe valves.

Accordingly, a primary object of the present invention is to provide a hydraulic control system for a plurality of fluid actuated devices which ensures that a particular fluid actuated device receives an adequate supply of fluid even when being used in conjunction with one or more of the other fluid actuated devices.

Another object of the present invention is to provide a hydraulic control system for a plurality of fluid actuated devices which employs a modified center core signal system, modified to enable the system to provide an adequate supply of fluid to a particular fluid actuated device even when this device is used in conjunction with one or more of the other fluid actuated devices.

Yet another object of the present invention is to provide a hydraulic control system for a combination loader and backhoe vehicle which will prevent the variable displacement pump of the present invention from increasing its displacement to maximum displacement in order to meet the flow demands of the loader valve when this valve is fully actuated and the vehicle is in motion.

Thus, a hydraulic control system, according to the present invention, includes a fluid reservoir and a variable displacement pump having a fluid input in fluid communication with the fluid reservoir and a fluid output. The present control system also includes a first control valve having a fluid input in fluid communication with the fluid output of the variable displacement pump, the first control valve being adapted to regulate a flow of fluid to a first fluid actuated device and including first means for developing a first pressure signal. At least a second control valve is included having a fluid input in fluid communication with the fluid output of the variable displacement pump, the second control valve also being adapted to regulate a flow of fluid to a second fluid actuated device and including second means for developing a second pressure signal. A selector means senses the first and second pressure signals and provides a control pressure signal which is the smaller of the first and second pressure signals. Finally, the present invention includes a fluid actuated displacement control means in fluid communication with the selector means, for sensing the control pressure signal provided by the selector means and for regulating the displacement of the pump in response to the magnitude of the control pressure signal.

BRIEF DESCRIPTION OF THE DRAWING

A preferred embodiment of the present invention is described with reference to the single accompanying drawing which is a schematic diagram of a hydraulic control system according to the present invention as used in a combination loader and backhoe.

DETAILED DESCRIPTION OF THE PREFERRED EMBODIMENT

With reference to the single accompanying figure, a preferred embodiment of a hydraulic control system 10, according to the present invention, for controlling the distribution of fluid to a plurality of fluid actuated devices on a combination loader and backhoe vehicle, includes a variable displacement pump 12. The variable displacement pump 12 has its fluid input in fluid communication with a fluid reservoir 14. The pump 12 is provided with a fluid actuated displacement control mechanism 16 for controlling the displacement of the pump 12. The displacement control mechanism 16 includes a displacement control cylinder 18 which is mechanically linked to the pump 12, and a sensor valve 22 which communicates with both the displacement control cylinder 18 and the reservoir 14.

The displacement control cylinder 18 includes a spring biased piston 20 which is mechanically linked to the pump 12. A spring 19 biases the piston 20 to the left (as shown in the single figure) so that the displacement of the pump 12 is initially at maximum displacement. The sensor valve 22 is a metering valve having first operative positions 24, a neutral position 26, and second operative positions 28. A spring 30, on the right side of the sensor valve 22, biases the sensor valve 22 toward the first operative positions 24 in which the high pressure side of the displacement control cylinder 18 communicates with, and is vented to, the reservoir 14. As is conventional with metering valves, the further the sensor valve 22 is moved from the neutral position 26 toward the first operative positions 24, the smaller will be the resistance to fluid flow through the valve and the greater will be the fluid flow through the valve, and the more quickly the high pressure side of the displacement control cylinder 18 will be vented to the reservoir 14. In the neutral position 26 fluid flow through the sensor valve 22 is blocked and the displacement control cylinder 18 is hydraulically locked. The left side of the sensor valve 22 is biased by a control pressure signal 32 toward the second operative positions 28 in which the control pressure signal is communicated to the displacement control cylinder 18 in order to urge the piston 20 to move to the right, to thereby reduce the displacement of the variable displacement pump 12. Again, the further the sensor valve 22 is moved from the neutral position 26 toward the second operative positions 28, the smaller will be the resistance to fluid flow through the valve. The control pressure signal 32, which is discussed more fully below, is communicated to the input of the sensor valve 22 through a line 34 and is communicated to the left side of the sensor valve 22 through a line 33 which branches off from the line 34 upstream from the sensor valve 22.

The output of the pump 12 is communicated through a line 44 to a priority valve 46. The priority valve 46 communicates through a line 48 with a steering valve 50, and through a line 58 with a loader valve 60. The loader valve 60, in turn, communicates with a stabilizer valve 70 through a line 67. The priority valve 46, the steering valve 50, the loader valve 60, and the stabilizer valve 70, are conventional, and need not be discussed in detail here. The function of the priority valve 46 is to give fluid flow priority to the steering valve 50 over the loader valve 60 and the stabilizer valve 70, as well as over the other valves in the hydraulic control system downstream from the line 58 discussed below.

A portion of the fluid flowing through the line 58 to the loader valve 60 is diverted from the loader valve through a line 80 which intersects the line 58 upstream from the loader valve. The line 80 contains a flow control valve 82 which includes a variable orifice 84. The line 80 leads, through a line 81, to a swing valve and a backhoe valve, described below. One function of the line 80 and flow control valve 82, as is explained more fully below, is to divert a relatively small amount of flow from the loader valve 60 and stabilizer valve 70 to the line 80. This small amount of flow is used to define a pressure signal, large compared to the pressure downstream from the loader and stabilizer valves when these valves are fully actuated, which pressure signal is communicated to the pump 12 in order to prevent the pump from going to maximum displacement when the loader or stabilizer valves are fully actuated. Yet another function of the flow control valve 82 is to limit the amount of flow diverted from the loader valve 60 and stabilizer valve 70 through the line 80, in order to assure the loader valve and stabilizer valve an adequate supply of flow when these valves are actuated. The flow control valve 82 accomplishes this function by presenting a greater resistance to fluid flow through the line 80 than the resistance to fluid flow through the lines 58 and 67 created by the actuation of the loader valve 60 and stabilizer valve 70.

The loader valve 60, may, for example, include two valves arranged serially with respect to one another, each open center metering valve containing a variable orifice in its center. The line 58 from the priority valve 46 would communicate with the input of the first of these valves as well as with the input to the variable orifice in the center of this valve. In addition, the output from the variable orifice in the center of the first of these valves would communicate with the input to the second of these valves as well as with the input to the variable orifice in this second valve. If each of the valves is actuated by a plunger which moves the valve from a neutral position to an operating position, then the cross-sectional area of the variable orifice in the center of each of the valves would be reduced as the plunger of that valve moves from the neutral position to an operating position, and the pressure downstream from each of the variable orifices would be correspondingly reduced. Thus, the pressure downstream from the second of the variable orifices would be indicative of the total flow demanded by the loader valve 60.

The stabilizer valve 70 may, for example, include two serially arranged valves, with each valve containing a variable orifice in its center. The line 67 would communicate the output from the second of the variable orifices in the loader valve 60 to the input of the first of the valves of the stabilizer valve 70 as well as to the input of the variable orifice in the first of these valves. The output from the variable orifice in the first valve of the stabilizer valve 70 would be communicated to the input of the variable orifice in the second valve, whose output would then be communicated through a line 79 to a line 81 which extends from the point of intersection of the lines 79 and 80, which line 80 branches off from the line 58 feeding the loader valve 60. If each of the valves of the stabilizer valve 70 is actuated by a plunger which moves the valve from a neutral position to an operating position, then as these plungers are moved to their respective operating positions, the flow demanded by the stabilizer valve and by the loader valve would be reflected by the pressure in the line 79 downstream from the second of the variable orifices in the stabilizer valve 70.

It is often common to use the loader valve 60 when the combined loader and backhoe vehicle is in motion. The stabilizer valve 70 and the backhoe valve section, described below, being used when the vehicle is stationary. If the loader valve 60 and stabilizer valve 70 were fully actuated, then the pressure downstream from these valves communicated to the line 81 through the line 79 would necessarily be relatively low. This relatively low pressure would then be communicated through the center core signal system described below to the displacement control mechanism 16, which mechanism would act to drive the pump 12 toward maximum displacement. However, the flow control valve 82 prevents this from happening by generating a relatively large pressure signal which is communicated through the line 80 and added to the relatively low pressure signal in the line 79 from the fully actuated loader or stabilizer valves to produce a combined pressure signal in the line 81 to prevent the pump 12 from going to maximum displacement.

The backhoe valve section 89 of hydraulic control system 10 of the present invention includes a swing valve 90 and at least one other valve. The backhoe valve section 89 is usually used only when the combined loader and backhoe vehicle is stationary. The backhoe valve section may, for example, include a bucket valve 100. In addition, the backhoe valve section may also include a dipper valve, a boom valve, and a dipper extension valve arranged serially with respect to the bucket valve. Each of the swing and backhoe valves is preferably an open center metering valve. The swing and bucket valves also include a modified center core signal system which ensures that the swing valve 90 always gets an adequate supply of fluid even when being used in conjunction with the other backhoe valves. This modified center core signal system includes a variable orifice in the center of each of the swing and other backhoe valves. That is, the swing valve 90 includes a relatively small, variable orifice 92 in its center. Similarly, the bucket valve 100 of the backhoe valve section includes a relatively small, variable orifice 102 in its center, while each of the dipper, boom, and dipper extension valves, if included in the backhoe valve section, would also include a relatively small, variable orifice in its center.

The swing valve 90 includes a fluid input 93 which is in fluid communication with the flow line 81 through a flow line 94 which branches off from the flow line 81, and through a flow line 95. In addition, the input to the variable orifice 92 of the swing valve 90 also communicates with the flow line 81 through a flow line 98 which branches off from the flow line 81 at a point downstream from where the flow line 94 branches off from the flow line 81. Because the swing valve 90 (and other backhoe valves) are typically used only when the combined loader and backhoe vehicle is stationary and the loader valve 60 and stabilizer valve 70 are in their neutral positions, the input 93 of the swing valve 90 receives its supply of working fluid from the pump 12 through the lines 44 and 58, almost without any resistance to flow through the lines 67 and 79 (when the loader and stabilizer valves are in their neutral positions), and then through the lines 81, 94, and 95. Of course, a portion of the relatively small pressure signal flow diverted through the flow control 82 is also supplied to the input 93 through the flow lines 80, 81, 94, and 95. The input to the variable orifice 92 receives a portion of the fluid flowing through the loader valve 60, line 67, stabilizer valve 70, and line 79, via the flow lines 81 and 98. In addition, a portion of the relatively small pressure signal flow diverted through the flow control valve 82 is also supplied to the input of the variable orifice 92 through the flow lines 80, 81, and 98.

The swing valve 90 includes a neutral position 90*a* in which fluid communication between the variable displacement pump 12 (through the flow lines 44, 58, 67, 79, 81, 94, and 95) and the fluid actuated device regulated by the swing valve 90, is blocked. The swing valve 90 also includes first operating positions 90*b*, and second operating positions 90*c*. When a plunger 97 of the swing valve 90 is used to move the swing valve 90 from the neutral position 90*a* toward one of the operating positions, the extent of which motion corresponds to the flow demands of the swing valve 90, the cross-sectional area of the variable orifice 92 is progressively reduced during the motion of the plunger and the pressure downstream from the variable orifice 92 is indicative of the flow demands of the swing valve 90. The pressure at the outlet of the variable orifice 92 in the swing valve 90, which pressure constitutes a first pressure signal 140, is communicated through a line 150 to a selector valve 160, which is described more fully below.

The output from the variable orifice 92 in the swing valve 90 is communicated through a flow line 101 to the input of the variable orifice 102 in the bucket valve 100. In addition, the input to the bucket valve 100 receives its fluid supply through a line 105 which branches off from a node 104 of the flow line 94. Thus, the input to the bucket valve 100 communicates with the variable displacement pump 12 through the flow lines 44, 58, 67, 79, 81, 94, and 105. In addition, fluid communication is provided between the flow line 94 and the flow line 101 by a flow line 108 which branches off from the flow line 94 at a node 107 which is arranged upstream from the node 104. In order to regulate the amount of flow going to the input 103 of the bucket valve 100, as compared to the amount of flow going to the input 93 of the swing valve 90, a flow control valve 180 is arranged in the flow line 94 between the nodes 96 and 107. The flow control valve 180 includes a variable orifice 182. The flow control valve 180 provides a means for regulating the amount of flow going to the bucket valve 100, thereby helping to ensure that the swing valve 90 receives some flow even when being used in conjunction with the bucket valve.

The bucket valve 100 includes a neutral position 100*a* in which fluid communication is blocked between the pump 12 and the fluid actuated device regulated by the bucket valve 100. The bucket valve 100 also includes first operating positions 100O*b*, and second operating positions 100*c*. When a plunger 109 of the bucket valve 100 is used to move the valve from the neutral position 100*a* toward one of the operating positions, the cross-sectional area of the variable orifice 102 is progressively reduced. The pressure at the outlet of the variable orifice 102 of the bucket valve 100 will, of course, be reduced as the cross-sectional area of the variable orifice 102 is reduced, and will thus be indicative of the flow demands of the bucket valve 102.

If the backhoe valve section 89 of the present invention were to include additional valves such as a dipper valve, a boom valve, and a dipper extension valve, then these could, for example, be similar to the bucket valve 100 and serially arranged with respect to one another, each bearing a flow relationship to the preceding valve similar to the flow relationship between the bucket valve 100 and the swing valve 90. That is, the input of the variable orifice of each of these additional backhoe valves would communicate with the output of the variable orifice of the previous valve, and the inputs to each of these valves would be supplied with fluid through flow lines branching off from the line 94. Of course, the output of the variable orifice of the last of these valves would then communicate with the selector valve 160, described below, rather than the output of the variable orifice 102 of the bucket valve 100.

As noted earlier, the flow control valve 180 in the line 94 regulates the total amount of flow going to the input of the bucket valve 100, as well as to any additional valves included in the backbackhoe valve section, as compared to the flow going to the input of of the swing valve 90 through the line 95. This is a consequence of of the fact that the input of each of the additional backhoe valves receives its flow from a line which branches off from the successive nodes along the line 94 downstream from the flow control valve 180.

The pressure at the output of the variable orifice 102 of the bucket valve 100, which constitutes a second pressure signal 155, is communicated through a line 156 to the selector valve 160 referred to above. In addition, and as noted earlier, the pressure at the outlet of the variable orifice 92 of the swing valve 90, which constitutes the first pressure signal 140, is also communicated to the selector valve 160 through the line 150. The selector valve 160 is a two-position valve intended to select, and communicate, a control pressure signal which is the lower of the first and second pressure signals 140 and 155 communicated to the selector valve 160 through the lines 150 and 156. This control pressure signal is the control pressure signal 32 which is communicated by the selector valve 160 to the sensor valve 22 through the line 34.

The selector valve 160 includes a first operative position 160*a*, the top-most position (as shown in the figure), and a second operative position 160*b* which is the bottom-most operative position. A spring 162, arranged on the top side of the selector valve 160, biases the selector valve to the position 160*a*. In addition, the second pressure signal 155 is also communicated to the top side of the selector valve 160 through a line 164 which branches off from the line 156, and is also used to bias the selector valve 160 to the operative position 160*a* in conjunction with the spring 162. On the other hand, the first pressure signal 140 is communicated to the bottom side of the selector valve 160 through the line 150 to oppose the biasing force exerted by the spring 162 and the first pressure signal 155. That is, the first pressure signal 140 acts to bias the selector valve 160 to the second operative position 160*b*.

When the first pressure signal 140 is smaller in magnitude than the second pressure signal 155, the selector valve 160 is biased by the spring 162 and the second pressure signal 155 to the first operative position 160*a*. In this first operative position, the first pressure signal 140 is communicated through a line 158 which branches off from the line 150 to the input of the selector valve 160, and is transmitted through the line 34 as the control pressure signal 32. On the other hand, when the first pressure signal 140 is greater in magnitude than the second pressure signal 156 and exerts a biasing force greater than the biasing force exerted by the spring 162 and the second pressure signal 155, then the selector valve 160 is pushed to the second operative position 160*b*, and in this position the second pressure signal 155 is transmitted by the selector valve as the control pressure signal 32. Thus, the selector valve 160 acts like a logic device, which selects and provides a control pressure signal 32 which is the smaller of the first and second pressure signals 140 and 155 communicated to the selector valve.

The operation of the hydraulic control system 10 of the present invention is as follows. When the prime mover of the combined loader and backhoe vehicle in which the present invention is incorporated is started, which prime mover powers the variable displacement pump 12, the spring biased piston 20 of the displacement control cylinder 18 initially biases the pump 12 to maximum displacement. If all of the valves downstream from the pump 12 are in their neutral positions, and no flow is being demanded of the pump 12, then the pressure drops across the variable orifices in the various valves of the hydraulic control system 10 will be relatively small, and thus the control pressure signal 32 communicated to the sensor valve 22 will be relatively high. The relatively high control pressure signal 32 which is communicated through the lines 34 and 33 to the left side of the sensor valve 22 will be high enough to overcome the biasing force exerted by the spring 30 and force the sensor valve 22 toward the second operative positions 28 so that the control pressure signal 32 can be communicated to the displacement control cylinder 18 in order to force the piston 20 to move to the right to thereby reduce the displacement of the pump 12.

Once one or more of the various valves of the control system 10 are actuated, for example, the loader valve 60 and the stabilizer valve 70, then the displacement control system 16 will appropriately vary the displacement of the pump 12 to meet the flow demands of these actuated valves. That is, as the pressure drops across the variable orifices in the actuated valves of the hydraulic control system 10 begin to increase, then the control pressure signal 32 communicated to the sensor valve 22 will begin to decrease. This control pressure signal will then no longer be able to overcome the biasing force exerted by the spring 30 and the sensor valve 22 will be pushed toward the first operative positions 24 wherein the high pressure side of the displacement control cylinder 18 will be vented to the reservoir 14, the piston 20 pushed to the left by the biasing spring 19, and the displacement of the pump 12 increased to meet the increased flow needs of the actuated valves. Thus, a decrease in the magnitude of the control pressure signal 32 results in an increase in the displacement of the pump 12.

If the steering valve 50 is actuated, then the priority valve 46 will ensure that all of the flow demands of the steering valve 50 are met, even at the expense of the various other valves in the hydraulic control system 10. As the flow demands of the steering valve 50 are reduced, the priority valve 46 will operate to allow more and more fluid to pass through the line 58 to the loader valve 60 and the stabilizer valve 70. Of course, a portion of the fluid flowing through the line 58 will be diverted to the line 80 across the flow control valve 82.

Typically, the loader valve 60 is only actuated when the combined loader and backhoe vehicle is in motion. As the flow demands of the loader valve 60 or the stabilizer valve 70 begin to increase, then the pressure in the line 79 downstream from the variable orifices in these valves will begin to decrease. If the pressure signal generated by the flow control valve 82 is momentarily ignored, then it follows that the pressure in the line 79 is communicated to the variable orifices in the backhoe valve section 89 through the line 81. Because the swing valve 90 and the other backhoe valves are usually not used when the vehicle is in motion, the variable orifices 92 and 102 in the swing valve 90 and the bucket valve 100 will be fully open, and thus little or no pressure drop will occur across these orifices. Thus, the decreasing pressure in the line 79 will be communicated, almost unchanged, through the orifice 92 and the line 150 as the first pressure signal 140 to the bottom of the selector valve 160, while the decreasing pressure in the line 79 will also be communicated, almost unchanged, through the orifices 92 and 102 and the lines 156 and 164 to the top of the selector valve 160. Since the first and second pressure signals will necessarily be virtually equal in magnitude, the first pressure signal 140 will be communicated as the control pressure signal 32 to the displacement control mechanism 16 by the selector valve 160 because the biasing force exerted by the first pressure signal 140 will necessarily be less than the biasing force exerted by the nearly equal second pressure signal 155 and the spring 162. Because the control pressure signal 32 will be virtually equal to the decreasing pressure in the line 79, the displacement control mechanism 16 will act to increase the displacement of the variable displacement pump 12 to meet the increasing flow demands of the loader valve 60 or the stabilizer valve 70 in response to the decreasing control pressure signal 32.

If the loader valve 60 or the stabilizer valve 70 were to be fully actuated, and if there were no flow line 80 and flow control valve 82, then the relatively low pressure in the line 79 would be transmitted, virtually unchanged, through the line 81 and through the modified center core signal system of the present invention, as the control pressure signal 32, driving the pump 12 to maximum displacement. The existence of the flow control valve 82 in the line 80, however, prevents the increasing flow demands of the loader valve 60 and stabilizer valve 70 from driving the pump 12 to maximum displacement. That is, the relatively small amount of flow diverted from the line 58 through the line 80 and across the flow control valve 82, results in a pressure signal which, together with the relatively low pressure in the line 79, is transmitted through the line 81 and through the modified center core signal system of the present invention as the control pressure signal 32. Since this combined pressure signal is always greater in magnitude than the pressure in the line 79, the pump 12 is never driven to maximum displacement.

When the combined loader and backhoe vehicle comes to rest and has been stabilized, the loader valve 60 and the stabilizer valve 70 will usually have been returned to their neutral positions, while the swing valve 90 and the backhoe valves will be actuated. Because the loader valve 60 and the stabilizer valve 70 are in their neutral positions, the variable orifices in these valves will be open, and the inputs to the swing valve 90 and the bucket valve 100 (as well as any other valves included in the backhoe valve section) will receive their flow supply, almost without restriction, through the line 58, the loader valve 60, the line 67 the stabilizer valve 70, the line 79, the line 81, and the line 94.

The flow control valve 180 in the line 94 acts to regulate the amount of flow going to the input of the bucket valve 100 (as well as the inputs of any other valves included in the backhoe valve section) as compared to the amount of flow going to the input of the swing valve 90. Furthermore, the modified center core signal system acts to ensure that the input to the swing valve 90 always receives at least a certain minimum amount of the flow even when the swing valve 90 is being used in conjunction with the bucket valve (or any other valve included in the backhoe valve section). That is, as the swing valve 90 is moved from its neutral position 90*a* toward one of its operating positions, the first pressure signal 140 at the outlet of the variable orifice 92 in the swing valve 90 will correspondingly decrease, and this first pressure signal will be communicated to the selector valve 160. This first pressure signal 140 is also communicated through the line 101 to the input of the variable orifice 102 in the bucket valve 100. If the bucket valve 100 is moved from its neutral position 100*a* to one of its operating positions, then the pressure at the outlet of the bucket valve 100, that is, the second pressure signal 155, will be correspondingly reduced below that of the first pressure signal 140. The selector valve 160 will then pass the lower of the two pressure signals communicated to it, that is, the second pressure signal 155, which will constitute the control pressure signal 132 communicated to the sensor valve 22.

Thus, the greater the movement of the bucket valve 100 from its neutral position to one of its operating positions, the smaller in magnitude will be the control pressure signal 32. If this control pressure signal 32 is of relatively small magnitude, then it will not be sufficient to overcome the opposed biasing force exerted by the spring 30 on the sensor valve 22, and the sensor valve 22 will remain in one of the operative positions 24. Thus, the high pressure side of the piston 20 in the displacement control cylinder 18 will be vented to the fluid reservoir 14, and the displacement of the variable displacement pump 12 will increase in order to meet the flow demands of the bucket valve (as well as any other valves included in the backhoe valve section). In this fashion, the modified center core signal system acts to increase the displacement of the pump 12 in order to meet the flow demands of the backhoe valve, and to thereby ensure that the swing valve 90 receives at least a certain minimum amount of flow.

The hydraulic control system of the present invention is advantageous because the modified center core signal system incorporated within the present invention operates to ensure that the swing valve receives at least a certain minimum amount of flow even when being used in conjunction with one of the backhoe valves.

The hydraulic control system of the present invention is also advantageous because it operates to prevent the loader valve and the stabilizer valve from using an excessive amount of fluid.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed:

1. A hydraulic control system, comprising:

a fluid reservoir;

a variable displacement pump having a fluid input in fluid communication with said fluid reservoir and a fluid output;

a first control valve having a fluid input in fluid communication with said fluid output of said variable displacement pump, said first control valve being adapted to regulate a flow of fluid to a first fluid actuated device and including first means for developing a first pressure signal;

at least a second control valve having a fluid input also in fluid communication with said fluid output of said variable displacement pump, said second control valve also being adapted to regulate a flow of fluid to a second fluid actuated device and including second means for developing a second pressure signal;

selector means for sensing individually said first and second pressure signals and for providing a control pressure signal which is the smaller of said first and second pressure signals and which is independent of the load placed on said first or second control valves by said first or second fluid actuated devices; and fluid actuated displacement control means, which control means is in fluid communication with said selector means, for sensing said control pressure signal provided by said selector means and for regulating the displacement of said pump in response to the magnitude of said control pressure signal.

2. Apparatus in accordance with claim 1 wherein fluid communication between said first fluid actuated device and said variable displacement pump is blocked when said first control valve is in a neutral position, and fluid communication between said first fluid actuated device and said variable displacement pump is established when said first control valve is in an operating position; and wherein said first means for developing a first pressure signal includes a first variable orifice in said first control valve, said variable orifice communicating with said variable displacement pump and said selector means, and said orifice becoming progressively more restricted as said first control valve is moved from said neutral position toward said operating position.

3. Apparatus in accordance with claim 2 wherein fluid communication between said second fluid actuated device and said variable displacement pump is blocked when said second control valve is in a neutral position, and fluid communication between said second fluid actuated device and said variable displacement pump is established when said second control valve is in an operating position; and wherein said second means for developing a second pressure signal includes a second variable orifice in said second control valve, said second variable orifice communicating with said first variable orifice in said first control valve and with said selector means, said second orifice becoming progressively more restricted as said second control valve is moved from said neutral position of said second control valve toward said operating position of said second control valve.

4. Apparatus in accordance with claim 1 further comprising flow control means for regulating the flow of fluid from said variable displacement pump to said fluid input of said second control valve as compared to the flow of fluid from said variable displacement pump to the fluid input of said first control valve.

5. Apparatus in accordance with claim 4 wherein said flow control means includes a flow control valve having a variable orifice.

6. Apparatus in accordance with claim 1 further comprising:

a priority valve arranged near, and in fluid communication with, the fluid output of said variable displacement pump;

a third control valve having a fluid input in fluid communication through a first fluid flow path with said priority valve, said third control valve being adapted to regulate a flow of fluid to a third fluid actuated device;

a fourth control valve having a fluid input in fluid communication through a second fluid flow path with said priority valve, said fourth control valve being adapted to regulate a flow of fluid to a fourth fluid actuated device;

said priority valve giving fluid flow priority to said third control valve over said fourth control valve; and flow control means for diverting a portion of the fluid in said second flow path away from said fourth control valve to said first control valve, said flow control means including a third fluid flow path diverging from said second fluid flow path and leading to said first flow control valve.

7. Apparatus in accordance with claim 6 wherein said flow control means further includes a flow control valve in said third fluid flow path to limit fluid flow in said third fluid path, which flow control valve includes a variable orifice.

8. Apparatus in accordance with claim 7 further comprising a fifth control valve having a fluid input in fluid communication with said fourth control valve and a fluid output in fluid communication with said third fluid flow path, said fifth control valve being adapted to regulate a flow of fluid to a fifth fluid actuated device.

9. Apparatus in accordance with claim 6 wherein said first control valve is a swing valve, said second control valve is a backhoe valve, said third control valve is a steering valve, and said fourth control valve is a loader valve.

10. Apparatus in accordance with claim 8 wherein said fifth control valve is a stabilizer valve.

11. Apparatus in accordance with claim 1 further comprising:

a third control valve having a fluid input in fluid communication with said fluid output of said variable displacement pump and a fluid output in fluid communication with the inputs of said first and second control valves, said third control valve being adapted to regulate a flow of fluid to a third fluid actuated device; and flow control means, in fluid communication with the output of said variable displacement pump and with the inputs of said first, second and third control valves, for regulating the flow of fluid from said variable displacement pump to said first and second control valves as compared to the flow of fluid to said third control valve.

12. Apparatus in accordance with claim 11 further comprising:

a first fluid flow path through which said fluid input of said third control valve communicates with said fluid output of said variable displacement pump; and said flow control means includes a second fluid flow path diverging from said first fluid flow path and leading to said first control valve, and a flow control valve in said second fluid flow path to limit fluid flow in said second fluid flow path, which control valve includes a variable orifice.

13. Apparatus in accordance with claim 1 wherein said selector means includes a valve having first and second operative positions; and wherein said first pressure signal biases said valve toward said second position, in which position said valve transmits said second pressure signal as said control signal, and said second pressure signal biases said valve toward said first position in which said valve transmits said first pressure signal as said control signal.

14. A hydraulic control system comprising:

a fluid reservoir;

a variable displacement pump having a fluid input in fluid communication with said fluid reservoir and a fluid output;

a first control valve having a fluid input in fluid communication with said fluid output of said variable displacement pump and a fluid output, said first control valve being adapted to regulate a flow of fluid to a first fluid actuated device and including first means for developing a first pressure signal indicative of the demand of said first control valve;

flow control means having a fluid input in fluid communication with said input of said first control valve for developing a second pressure signal independent of the demand of said first control valve at a fluid output;

at least a second control valve having a fluid input in said fluid communication with said fluid output of said first control valve and said flow control means, said second control valve being adapted to regulate a flow of fluid to a second fluid actuated device and including second means for developing a third pressure signal indicative of said first and second pressure signals and the demand of said second control valve;

fluid actuated displacement control means for sensing said third pressure signal and for regulating the displacement of said pump in response to the magnitude of said third pressure signal; and wherein said second pressure signal in combination with said first pressure signal as input to said displacement control means through said second control device prevents said pump from going maximum displacement in response to said first pressure signal when said third pressure signal does not include a demand component of said second control device.

15. Apparatus in accordance with claim 4 wherein fluid communication between said first fluid actuated device and said variable displacement pump is blocked when said first control valve is in a neutral position, and fluid communication between said first fluid actuated device and said variable displacement pump is established when said first control valve is in an operating position; and wherein said first means for developing a first pressure signal includes a first variable orifice in said first control valve, and said orifice becoming progressively more restricted as said first control valve is moved from said neutral position toward said operating position.

16. Apparatus in accordance with claim 15 wherein fluid communication between said second fluid actuated device and said fluid output of said first control valve is blocked when said second control valve is in a neutral position, and fluid communication between said second fluid actuated device and said fluid output of said first control valve is established when said second control valve is in an operating position; and wherein said second means for developing a third pressure signal includes a second variable orifice in said second control valve, said second variable orifice communicating with said first variable orifice in said first control valve and with said flow control means, said second orifice becoming progressively more restricted as said second control valve is moved from said neutral position of said second control valve toward said operating position of said second control valve.

17. Apparatus according to claim 1 wherein said selector means provides said control pressure signal in response to comparison of said first and second individually sensed pressure signals.

* * * * *